(12) United States Patent
Paltashev et al.

(10) Patent No.: US 8,681,162 B2
(45) Date of Patent: Mar. 25, 2014

(54) SYSTEMS AND METHODS FOR VIDEO PROCESSING

(75) Inventors: Timour Paltashev, Laveen, AZ (US); John Brothers, Calistoga, CA (US); Yi-Jung Su, Alviso, CA (US); Yang (Jeff) Jiao, San Jose, CA (US)

(73) Assignee: VIA Technologies, Inc., Taipei (TW)

(*) Notice: Subject to any disclaimer, the term of this patent is extended or adjusted under 35 U.S.C. 154(b) by 798 days.

(21) Appl. No.: 12/905,743

(22) Filed: Oct. 15, 2010
(Under 37 CFR 1.47)

(65) Prior Publication Data
US 2012/0092353 A1 Apr. 19, 2012

(51) Int. Cl.
*G06T 1/00* (2006.01)

(52) U.S. Cl.
USPC ............................................ 345/522; 345/589

(58) Field of Classification Search
USPC ......................................... 345/425, 582, 511
See application file for complete search history.

(56) References Cited

U.S. PATENT DOCUMENTS

| | | | | |
|---|---|---|---|---|
| 8,243,086 B1* | 8/2012 | Diard | | 345/555 |
| 2006/0126962 A1* | 6/2006 | Sun | | 382/268 |
| 2007/0091102 A1* | 4/2007 | Brothers et al. | | 345/506 |
| 2009/0002379 A1* | 1/2009 | Baeza et al. | | 345/522 |
| 2010/0053180 A1* | 3/2010 | Ostiguy et al. | | 345/531 |

FOREIGN PATENT DOCUMENTS

CN 101216932 A 7/2008

OTHER PUBLICATIONS

English translation of abstract of CN 101216932 A (published Jul. 9, 2008).

\* cited by examiner

*Primary Examiner* — Said Broome
*Assistant Examiner* — Peter Hoang
(74) *Attorney, Agent, or Firm* — McClure, Qualey & Rodack, LLP

(57) ABSTRACT

A programmable graphics processing unit (GPU) includes a first shader stage configured to receive slice data from a frame buffer and perform variable length decoding (VLD), wherein the first shader stage outputs data to a first buffer within the frame buffer; a second shader stage configured to receive the output data from the first shader stage and perform transformation and motion compensation on the slice data, wherein the second shader stage outputs decoded slice data to a second buffer within the frame buffer; a third shader stage configured to receive the decoded slice data and perform in-loop deblocking filtering (IDF) on the frame buffer; a fourth shader stage configured to perform post-processing on the frame buffer; and a scheduler configured to schedule execution of the shader stages, the scheduler comprising a plurality of counter registers; wherein execution of the shader stages is synchronized utilizing the counter registers.

17 Claims, 7 Drawing Sheets

SYSTEMS AND METHODS FOR VIDEO PROCESSING

TECHNICAL FIELD

The present disclosure is generally related to data processing systems, and more particularly, is related to video data processing systems and methods.

BACKGROUND

Today, many computing architectures provide a central processing unit (CPU) for processing data, including video and graphics data. While a CPU may provide adequate processing capabilities for some video and graphics, a CPU may also be configured to process other data. Many graphics systems within such computing architectures are implemented through the use of a set of interfaces, such as MICROSOFT's Direct3D interface, OpenGL, etc., that offer control of multimedia hardware (e.g., a graphics accelerator or graphics processing unit (GPU)) on a computer running a particular operating system.

The generation of pictures or images is commonly referred to as rendering, and such operations are primarily implemented through a graphics accelerator. Generally, in three-dimensional (3D) computer graphics, geometry that represents surfaces (or volumes) of objects in a scene is translated into pixels (picture elements), stored in a frame buffer, and then displayed on a display device. Each object or group of objects may have specific visual properties related to the appearance of surfaces (materials, reflectance, shape, textures, etc.) which may be defined as a rendering context for the object or group of objects.

Various standards have been developed to improve the visual quality of generated images while requiring lower data rates. One of these standards, the H.264 specification (also known as the ISO Motion Picture Experts Group (MPEG)-4 part 10), is a high compression digital video codec standard. An H.264 compliant codec can encode video with approximately three times fewer bits than comparable MPEG-2 encoders while retaining similar video quality. Video processing of H.264 data is widely used for modern 3D graphics accelerators.

Special hardware units or general purpose central processing units (CPUs) are typically required for such processing. One perceived shortcoming with conventional architectures, however, is that such dedicated hardware for H.264 video processing will experience idle periods while a graphics processing unit (GPU) processes tasks relating to 3D graphics. Thus, a heretofore unaddressed need exists in the industry to address the aforementioned deficiencies and inadequacies.

SUMMARY

Briefly described, one embodiment, among others, includes a multi-shader system in a programmable graphics processing unit (GPU) for processing video data, comprising: a first shader stage configured to receive slice data from a frame buffer and perform variable length decoding (VLD), wherein the first shader stage outputs data to a first buffer within the frame buffer; a second shader stage configured to receive the output data from the first shader stage and perform transformation and motion compensation on the slice data, wherein the second shader stage outputs decoded slice data to a second buffer within the frame buffer; a third shader stage configured to receive the decoded slice data and perform in-loop deblocking filtering (IDF) on the frame buffer; a fourth shader stage configured to perform post-processing on the frame buffer; and a scheduler configured to schedule execution of the shader stages, the scheduler comprising a plurality of counter registers; wherein execution of the shader stages is synchronized utilizing the counter registers.

Another embodiment includes a method for processing video data utilizing a multi-shader configuration, comprising: mapping video playback functions to a plurality of shaders; retrieving wait values for each of the plurality of shaders, wherein the wait values indicate time for executing each shader; executing substantially in parallel in a command stream processor (CSP): a first shader for variable length decoding (VLD); a second shader for transformation and motion compensation; and a third shader for in-loop deblocking filtering (IDF).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
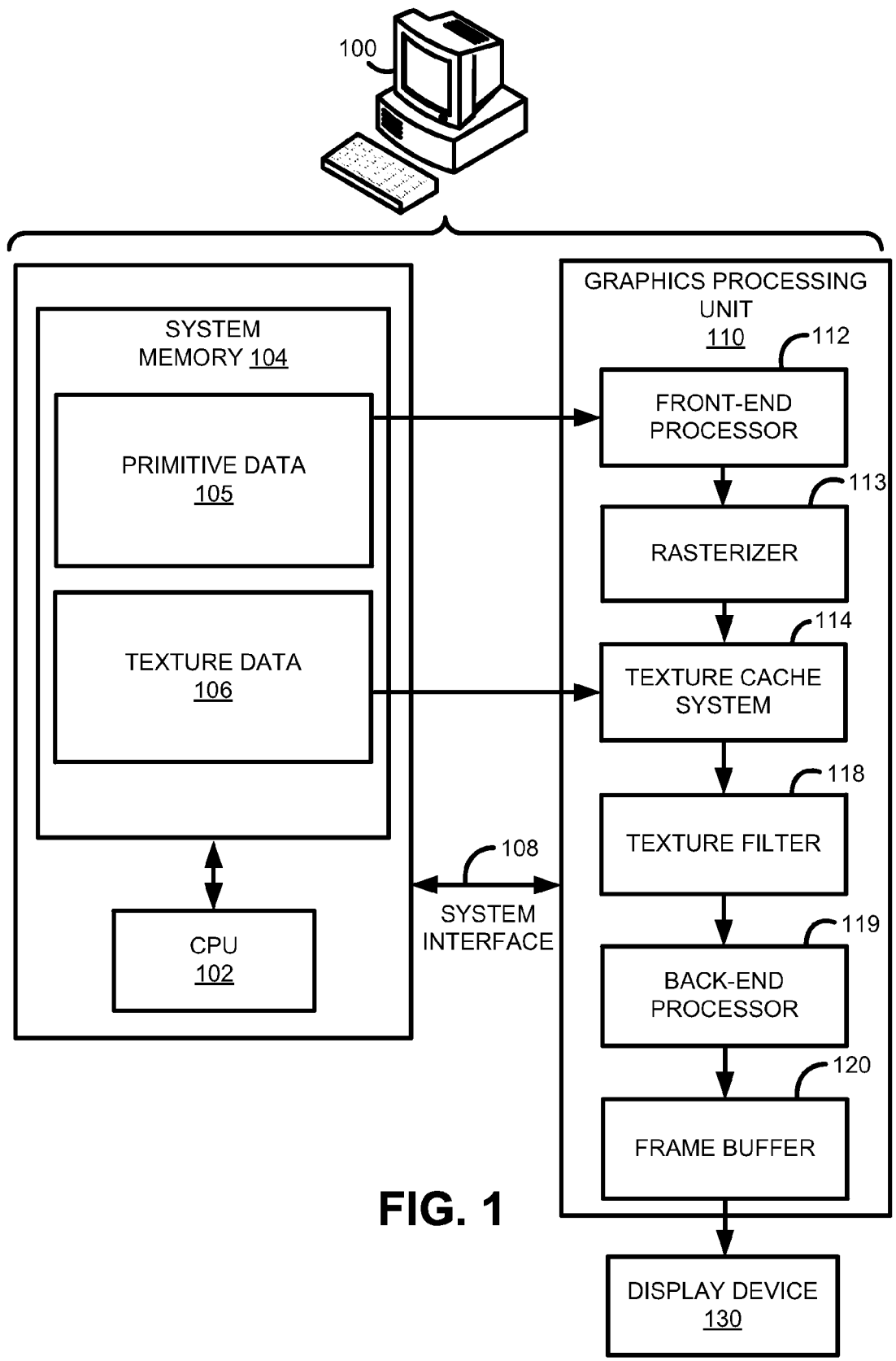
FIG. 1 is a block diagram of an embodiment of a multiple graphics processor system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As described earlier, special hardware units or general purpose central processing units (CPUs) are typically required for processing H.264 video data. Shaders are written to apply transformations to a large set of elements at a time, for example, to each pixel in an area of the screen, or for every vertex of a model. This is well suited for parallel processing, and most modern GPUs have a multi-core design to facilitate this, thereby improving efficiency of processing. One perceived shortcoming with conventional architectures, however, is that such dedicated hardware for H.264 video processing experience idle periods while a graphics processing unit (GPU) processes 3D graphics tasks. Accordingly, various embodiments are described in which programmable shaders are utilized to perform H.264 video processing, thereby offloading such video processing from the host CPU. Various instructions and registers are also described to provide synchronization between the various stages comprised of the programmable shaders.

Reference is made to FIG. 1, which illustrates a simplified block diagram of a computer system 100 in which embodiments described herein may be implemented. The computer system 100 includes a CPU 102, a system memory 104 and a graphics processing unit 110. The CPU 102 performs various functions, including determining information, such as a viewpoint location, which allows for the generation of graphic displays. The system memory 104 stores a variety of data, including graphic display data such as texture data 106.

The graphics processing unit 110, based on information determined by the CPU 102 and data stored in the system memory 104, generates display data for a display device 130, such as, for example, a monitor. Texture mapping is used to apply textures to objects. Graphics processing system 110 renders slices of a 3D object. The slices are essentially "stacked" up to form an object. Once a 3D texture is created, the texture is applied to the object to form an image whereby the object becomes textured.

The CPU 102 provides requests to the graphics processing unit 110 over a system interface 108, where such requests include requests to process and display graphics information. Graphics requests from the CPU 102 are received by the graphics processing unit 110 and provided to a front-end processor 112. The front-end processor 112 generates a pixel stream containing pixel coordinates. Information relating to the pixel coordinates generated by the front-end processor 112 is provided to a texture filter 118 through a texture cache system 114. The texture cache system 114 receives the information from the front-end processor 112 and organizes the texture data storing the data in cache memory.

The texture filter 118 then filters the information performing, for example, bilinear filtering, trilinear filtering, or a combination thereof, and generates texture data for each pixel. In addition to conventional texture filter components, such as linear interpolators and accumulators, the texture filter 118 also includes a programmable table filter for providing special filtering operations in conjunction with the other texture filter components. The texture data 106 is a component of the final color data that is sent to a frame buffer 120, which is used to generate a display on a display device 130.

The texture cache system 114 may include multiple caches, including, for example, a level 1 (L1) cache and a L2 cache. The texture information is stored as individual texture elements known as texels, which are used during graphics processing to define color data displayed at pixel coordinates. The texture data 106 flows from the system memory 104 to the texture cache system 114, and then to the texture filter 118.

Figure 2:
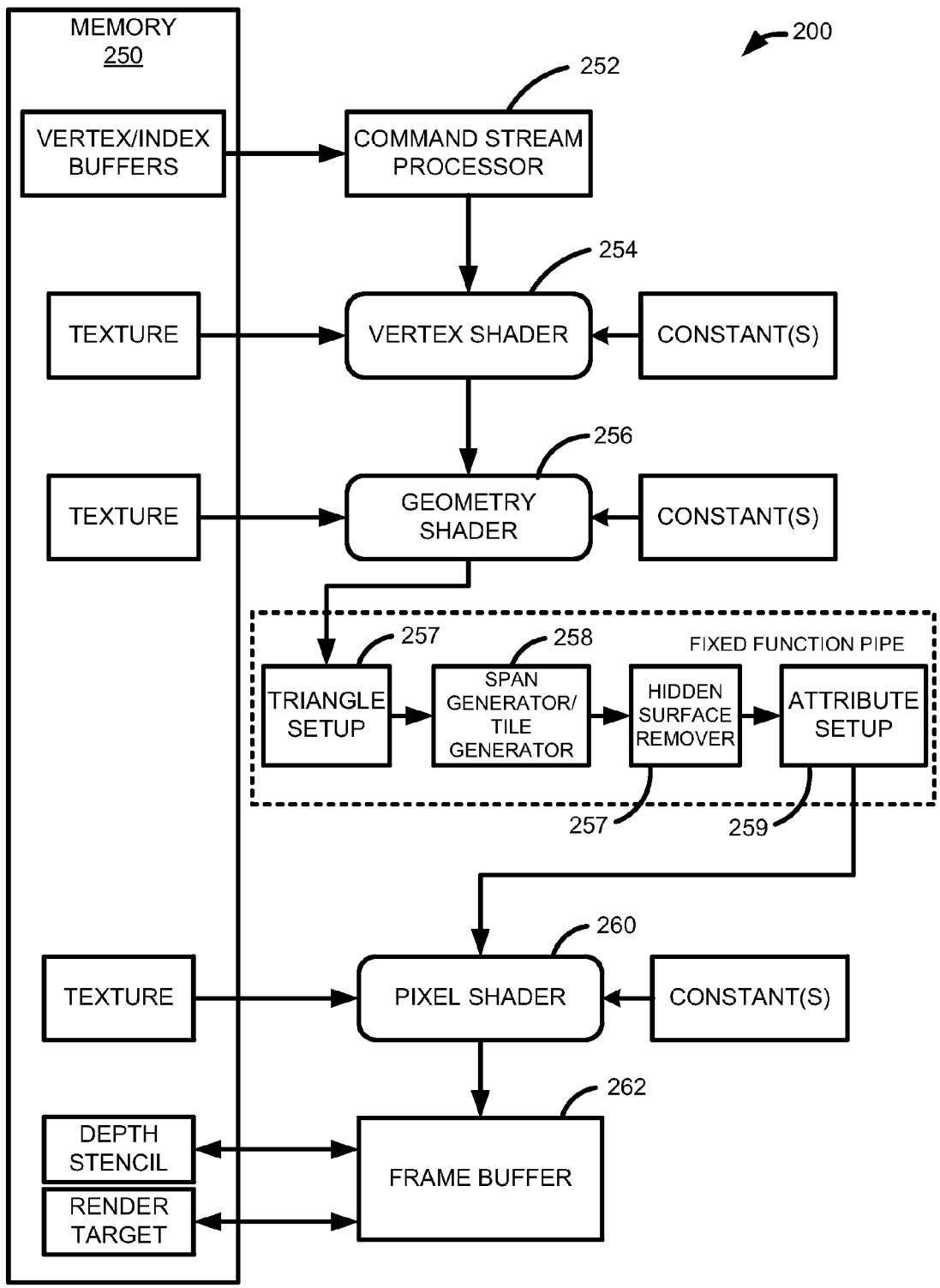
FIG. 2 depicts a block diagram illustrating programmable components of the graphics processor system in FIG. 1.
Figure 3:
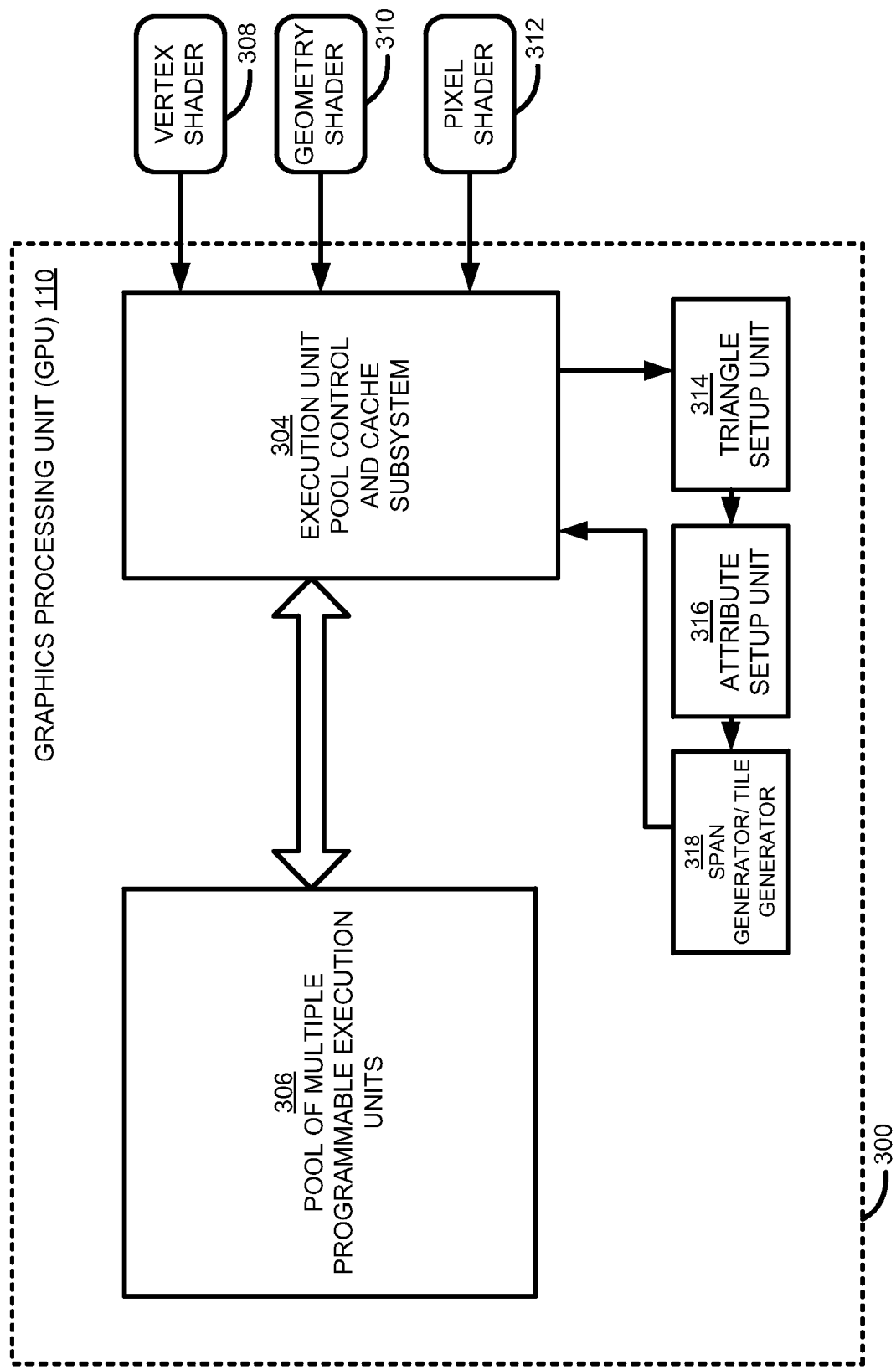
FIG. 3 depicts a functional block diagram illustrating the graphics processing unit in FIG. 1.

Reference is now made to FIG. 2 which is a block diagram illustrating certain components or stages of a graphics pipeline 200 within the GPU 110 in FIG. 1. The GPU 110 includes a command stream processor 252, which reads vertices from memory 250. The vertices are used to form geometry primitives and create working items for the pipeline. In this regard, the command stream processor 252 reads data from memory 250 and from that data generates triangles, lines, points, or other primitives to be introduced into the pipeline. This geometry information, once assembled, is passed to the vertex shader 254. The vertex shader 254 is depicted with rounded edges, which is a convention hereinafter adopted to depict those stages of a graphics pipeline that are implemented by executing instructions in a programmable execution unit or pool of execution units as depicted in FIG. 3. The vertex shader 254, as is known, processes vertices, by performing operations such as transformations, scanning, and lighting. Thereafter, the vertex shader 254 passes data to the geometry shader 256. The geometry shader 256 receives, as inputs, vertices for a full primitive, and is capable of outputting multiple vertices that form a single topology, such as a triangle strip, a line strip, point list, etc. The geometry shader 256 may be further configured to perform the various algorithms, such as tessellation, shadow volume generation, etc.

The geometry shader 256 outputs information to a triangle setup stage 257, which, as is known in the art, performs operations such as triangle trivial rejection, determinant calculation, culling, pre-attribute setup KLMN, edge function calculation and guardband clipping. The operations necessary for a triangle setup stage should be appreciated by one of ordinary skill in the art and need not be described further. The triangle setup stage 257 outputs information to the span and tile generator 258. This stage of the graphics pipeline is also known in the art and need not be discussed in further detail.

If a triangle processed by the triangle setup stage 257 is not rejected by the span and tile generator 258 or other stage of the graphics pipeline, then the attribute setup stage 259 of the graphics pipeline will perform attribute setup operations. The attribute setup stage 259 generates the list of interpolation variables of known and required attributes to be determined in the subsequent stages of the pipeline. Further, the attribute setup stage 259, as is known in the art, processes various attributes related to a geometry primitive being processed by the graphics pipeline.

The pixel shader 260 is invoked for each pixel covered by the primitive that is output by the attribute setup stage 259. As is known, the pixel shader 260 operates to perform interpolations and other operations that collectively determine pixel colors for output to a frame buffer 262. The operation of the various components illustrated in FIG. 2 are well known to persons skilled in the art, and need not be further described herein. Therefore, the specific implementation and operation internal to these units need not be described herein to gain and appreciate a full understanding of the present invention.

Reference is made to FIG. 3, which is a functional block diagram illustrating the graphics processing unit in FIG. 1. The graphics system includes the ability to create a programmable shader, such as a geometry shader 310, pixel shader 312, vertex shader 308, or others known in the art. Such shaders are created by a programmer and may be executed by at least one of a pool of multiple programmable execution units 306. It should be appreciated that the pool of execution units 306 can include a processing core capable of multi-threaded operation. Therefore, the pool of execution units 306 can initiate more than one thread allocated to a particular type of shader. For example, the pool of execution units 306 can initiate and execute a thread for a geometry shader 310 on one set of data simultaneously with a thread for a vertex shader 308 on another set of data.

Each execution unit in a pool of execution units 306 is capable of processing multiple instructions within a single clock cycle. Therefore, each execution unit can process multiple threads simultaneously. For example, as noted above, an execution unit can process a thread for geometry shader operations simultaneous with a thread for pixel shader operations. A scheduler receives incoming tasks from a plurality of shader stages to perform shader related computations and assigns them to execution units with capacity. The threads within execution units of the pool 306 are individually scheduled to perform shader-related computations, such that a given thread can be scheduled over time to perform shader operations for different shader stages. Further, within a given execution unit, certain threads may be assigned to a task of one shader, while other threads may be simultaneously assigned to tasks of the other shader units. In this way, load can be balanced among execution units in the system to achieve optimal throughput. Similarly, load can be balanced among available threads within a pool of execution units 306 to maximize throughput of the system. Since prior art graphics systems used dedicated shader hardware, robust and dynamic thread management such as in the above structure has previously not been utilized for graphics system. Accordingly, the flexibility and extendibility of graphics system of this structure have previously not been realized.

The execution unit pool control and cache subsystem 304 contains level 2 caches for use by the pool of execution units 306 as well as systems for scheduling the pool of executions units 306. In the depicted graphics processing unit, communication with the pool of execution units 306 to components external to the pool of execution units 306 is done via the execution unit pool control and cache subsystem 304. However, it is known that other lines and/or communication links may be established directly to the pool of execution units 306 to facilitate execution of a graphics pipeline. In particular, the triangle setup unit 314, attribute setup unit 312 and span and tile generator 318 are depicted as fixed function hardware logic components that can communicate to the pool of execution units 306 via the execution unit pool control and cache subsystem 304.

Figure 4:
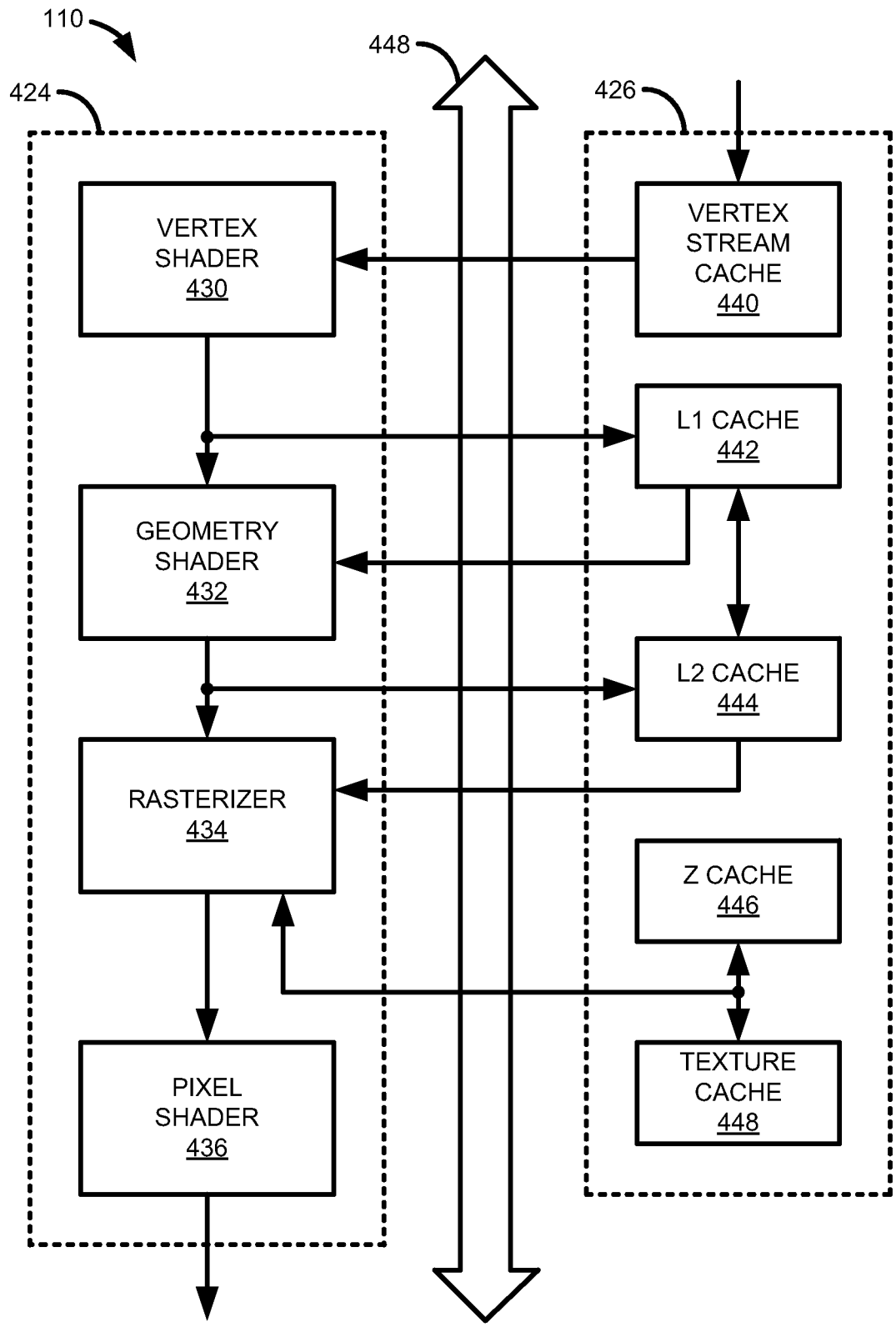
FIG. 4 is a block diagram of an embodiment of the graphics processing unit shown in FIG. 1.

FIG. 4 is another block diagram of an embodiment of the GPU 110 shown in FIG. 1. The GPU 110 generally includes a graphics processing pipeline 424 separated from a cache system 426 by a bus interface 428. The pipeline 424 includes a vertex shader 430, a geometry shader 432, a rasterizer 434, and a pixel shader 436. An output of the pipeline 424 may be sent to a write back unit (not shown). The cache system 426 includes a vertex stream cache 440, a level one (L1) cache 442, a level two (L2) cache 444, a Z cache 446, and a texture cache 448.

The vertex stream cache 440 receives commands and graphics data and transfers the commands and data to the vertex shader 430, which performs vertex shading operations on the data. The vertex shader 430 uses vertex information to create triangles and polygons of objects to be displayed. From the vertex shader 430, the vertex data is transmitted to geometry shader 432 and to the L1 cache 442. If necessary, data may be shared between the L1 cache 442 and the L2 cache 444. The L1 cache can also send data to the geometry shader 432. The geometry shader 432 performs certain functions such as tessellation, shadow calculations, creating point sprites, etc. The geometry shader 432 can also provide a smoothing operation by creating a triangle from a single vertex or creating multiple triangles from a single triangle.

The pipeline 424 also includes a rasterizer 434, which operates on data from the geometry shader 432 and L2 cache 444. Also, the rasterizer 434 may utilize the Z cache 446 for depth analysis and the texture cache 448 for processing based on color characteristics. The rasterizer 434 may include fixed function operations such as triangle setup, span tile operations, a depth test (Z test), pre-packing, pixel interpolation, packing, etc. The rasterizer 434 may also include a transformation matrix for converting the vertices of an object in the world space to the coordinates on the screen space.

The rasterizer 434 routes data to the pixel shader 436 for determining the final pixel values. The pixel shader 436 processes each pixel and alters the color values based on various color characteristics. The completed video frame is then output from the pipeline 424. As depicted in FIG. 2, the shader units 430, 432, 434 and fixed function units utilize the cache system 426 at a number of stages. Communication between the pipeline 424 and cache system 426 may include further buffering if the bus interface 428 is an asynchronous interface.

Figure 5:
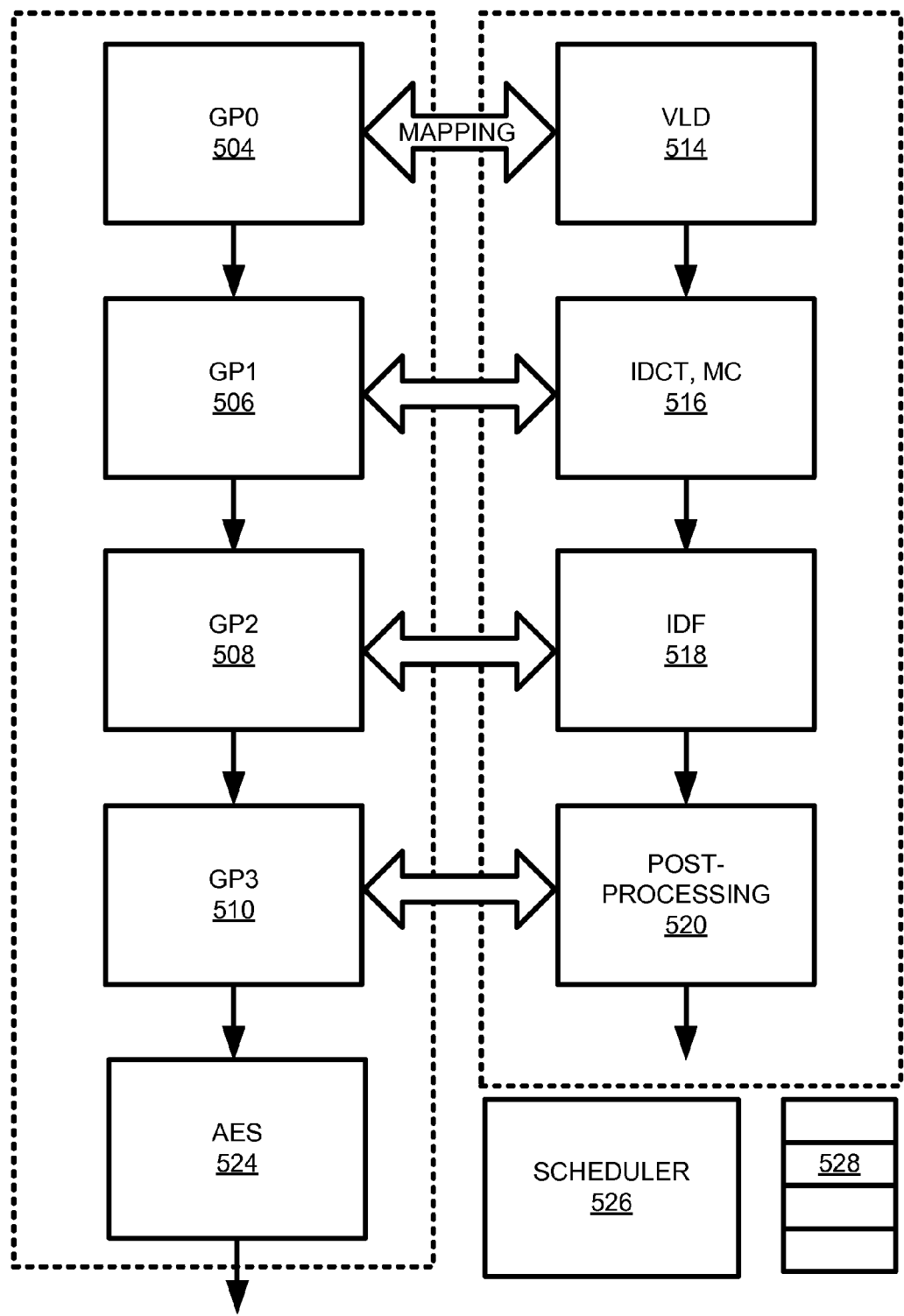
FIG. 5 illustrates one embodiment for mapping video playback functions to a multi-shader configuration using the graphics processing unit in FIG. 2.

In accordance with exemplary embodiments, a plurality of shader stages is utilized for H.264 playback, and the shader stages are implemented such that they correspond with various video processing stages implemented in conventional GPUs. Furthermore, the shader stages are executed in parallel in order to meet performance requirements for HD (high definition) H.264 video playback. With reference to FIG. 5, a first general purpose shader stage (denoted herein as GP0) 504 is utilized for variable length decoding (VLD) 514. A second general purpose shader stage (denoted as GP1) 506 is utilized for motion compensation and transform functions. Such functions may include inverse discrete cosine transform functions and motion compression 516. A third general purpose shader stage (GP2) 508 is used to perform in-loop deblocking filtering (IDF) 518. Finally, a fourth general purpose shader stage (GP5) 510 is used to perform general post-processing functions 520, which may comprise such functions as de-interlacing, scaling, color space conversion, etc.

In addition to video processing, the system comprises an AES module 524 configured to decrypt the bit stream in the command stream processor (CSP) and composite the final video frame onto the desktop in 3D. This normally involves vertex shading and pixel shading. It is possible in some instances, however, that while the video is being displayed across the full screen, compositing is disabled and no vertex shading or pixel shading is being performed.

All or a portion of the stages 504, 506, 508, 510 may be executed in parallel such that usage of VLD logic incorporated in GP0 504 is maximized. It should be emphasized that by maximizing usage of the VLD logic, this avoids only one block being active at any one time. Maximizing usage of the VLD logic is advantageous as the decoding logic associated with the VLD and VPU is generally the main bottleneck with respect to performance, particularly in the context of high bit rate H.264 bitstreams.

While decoding video, the video decoding stages 504, 506, 508, 510 are executed in parallel in a pipeline fashion, as currently done for 3D mode. When 3D mode is active for compositing, the decoding shaders 504, 506, 508, 510 can be switched to 3D mode, and the vertex shaders (VS) and pixel shaders (PS) are set up. Upon completion of the 3D command, the decoding shaders are switched back to video mode. While executing all the shader stages 504, 506, 508, 510 in parallel is preferred, the complexity and resources required for performing such parallel processing must be taken into consideration. Thus, in video mode, either three or four GP stages are executed in parallel to balance the complexity involved with operating multiple GP stages concurrently. In 3D mode, two 3D stages are running in parallel.

Having described the basic framework involving shader stages, the general purpose (GP) shader stages used for video processing are now described in more detail. As described earlier, a plurality of logical shader stages are implemented for video playback: GP0, GP1, GP2, and GP5. The shader stages operate in parallel in order to fully utilize the logic for performing VLD, transforms, motion compensation, and in-loop deblocking. It should be noted that the dedicated video processing unit (VPU) can be also incorporated into the overall processing of video data. For example, the programmable motion compensation stage may cooperate with the texture pipeline and additional VPUs.

As described earlier, the GP0 shader stage 504 generally performs VLD (variable length decoding). The GP0 shader 504 is also configured to read slice data from frame buffer memory and write resulting motion vectors, residual data, and macroblock control structures to another buffer in the frame buffer. One thread typically processes one slice. Slice streams are decoded into macroblocks based on motion compression (MC) and inverse discrete cosine transform (IDCT) operations.

Referring back briefly to FIG. 3, many computing architectures include one or more execution units (EUs) for processing data. More specifically, in at least one configuration, an EU may be configured to process a plurality of different types of data. A computing device may include a pool of execution units (EUs), where a pool of EUs may include one or more execution units for executing data in the computing architecture. Moreover, a shader stage may be executed on one or more of EUs.

Reference is made to FIG. 5. In order to enable the GP stages, the graphics driver supplies input data by creating command queues in memory for each of the enabled GP stages. The command queue entries can be, for example, 512-bits wide. In accordance with some embodiments, the command queues are located in video memory for performance reasons since reads to system memory will cause longer stalls. For each queue entry, one thread is kicked off. Whenever the graphics driver needs to execute more threads of a given GP stage, it should write additional entries to the end of the command queue and update corresponding registers. Once all of the allocated command buffers have been filed, the graphics driver should start filling a second command queue buffer. Once this is filled, it can switch back to the first buffer, or cycle through another buffer.

The GP1 shader stage 506 generally performs IDCT and motion compensation (MC) on a single slice. In particular, GP1 506 reads the output of the GP0 504 shader from frame buffer memory and in some cases, retrieves reference data from GP2 508. GP1 506 decodes the MC/IDCT stream and fetches MC predictor data to generate unfiltered YUV based video data. To perform this function, GP1 506 utilizes the programmable EU core in addition to a texture pipeline. The result of the GP1 506 stage is a decoded slice located in another buffer for one frame. Several GP1 506 threads are generally required to decode one frame when there are multiple slices within the frame. All threads for a particular frame will write to the same output buffer.

The GP2 shader stage 508 is configured to perform in-loop deblocking filtering (IDF) on one frame or field. The input to this stage is the frame output by GP1 506. One thread processes one frame. IDF is performed on un-filtered YUV-based video data to generate final YUV video data. GP2 508 only utilizes one programmable EU core. The output of this stage is often cycled back into the GP1 motion compensation stage 506.

The GP5 shader stage 510 is configured to perform frame post-processing, which includes such functions as Film Grain Technology (FGT), de-interlacing, and other features used for enhancing video quality. Such post-processing generally involves an entire frame for a given thread. It should be noted that the output of the GP2 shader stage 508 is not fed back into the decoding loop. GP5 510 also performs copying of Advanced Encryption System (AES) information in the CSP prior to execution of the VLD stage (GP0 504). In particular, this step involves copying the encrypted bit stream data from PCIE (peripheral component interconnect express) memory into the frame buffer and decrypting the bit stream during the copying process. This process is utilized for playback of protected content. As with GP2 508, GP5 510 only utilizes one programmable EU core. The AES key is generated before any of the four shader stage tasks, as the decryption key is used for VLD streams. GP5 510 also performs scaling functions by utilizing YUV video data as a texture source to map to a 3D rectangle surface. Accordingly, scaling and RGB conversion can be achieved in this stage.

Protected video playback involves encrypting high-value video content when being passed over the PCIE bus and then decrypting the video content when written to video memory. In Advanced Scheduler implementations the video content is re-encrypted when being paged to system memory. Two encryption schemes are supported: counter mode AES and Cascaded Cipher (BG-AES). Counter mode AES is normally be used to send partially decoded video streams and for paging data to and from system memory. The Cascaded Cipher scheme is typically used for fully decoded video data and is used to reduce the CPU load when encrypting data. Encryption/decryption involves the driver passing a key to the hardware. In order to prevent unauthorized access to the key, the keys are also sent in encrypted form across the bus. In particular, a "session" key is used to decrypt "content" keys. Content keys are used to encrypt the video data and are sent with each packet of video data. In alternative embodiments, one content key is sent for a multiple number of packets.

The shader stages described above reflect just one of many possible ways in which processing of video data may be partitioned among various stages. It should be appreciated that other configurations for processing video data may also be implemented and that such alternatives, modifications, and equivalents fall within the scope of this disclosure. Moreover, while the embodiments above are described in the context of H.264 data, other video formats such as VC-1, WMV9 (Windows Media Video 9), and MPEG-2 may be supported as well. It should be noted that other post-processing functions may be supported aside from those required for video playback and encoding such as, but not limited to, general purpose computing (i.e., GPGPU or General-Purpose computation on GPUs).

Having described each of the shader stages, synchronization among the shader stages is now described. Referring back briefly to FIG. 2, the system further comprises a scheduler 526 configured to control execution of the various shader stages 514, 516, 518, 520 described. The system further comprises counter registers 528, which will be described in detail later. Due to the interdependencies that exist between the various shader stages, a means for synchronizing the activities of each shader stage is implemented. Before describing the synchronization process, however, some of the dependencies that exist between shader stages are described to illustrate the need for synchronization between the various stages.

In general, to successfully decode a given video frame, the following events typically occur. First, an AES decryption key is generated during run-time so that the incoming video stream may be deciphered. This allows GP0 (VLD stage) to decode decrypted slice-based data. However, before GP0 can decode the decrypted slice data, the AES key is generated and the incoming video stream is first deciphered. The macroblock stream buffer should also contain an empty slot in order to accommodate incoming decoded slice data.

Execution of GP2 (MC/IDCT stage) requires that the VLD decoded macroblock stream contain an available slot prior to operation. Further, for each B/P slice type, GP2 generally requires that in-loop deblocking filtering (IDF) be performed on the referenced frame. GP3 (the IDF stage) requires that all slices in a given frame first undergo motion compression and inverse discrete cosine transform (IDCT) operations. GP4 (the post-processing stage) also requires that IDF be performed on all fields within a given frame and to all fields within a given group.

In general, the various GP stages described may or may not be linked together. When the GP stages are linked together, the output of one stage serves as the input to another stage. For example, the output of GP0 may be fed as an input into GP1. In some cases, however, data from more than one stage may be needed in order to begin processing. For example, with motion compensation, the macro block data output by the VLD stage (GP0) is needed, and reference frame data is often required from the IDF stage (GP2). Furthermore, output buffer to be written to should be available as the output buffer may be read by another stage further downstream. There may even be multiple output buffers in a particular case. As such, a check is conducted on the output buffer to be written to in order to ensure that the same output buffer is no longer being read by another stage. As a non-limiting example, the motion compensation shader stage (GP1) should ensure that the output buffer it will write to is no longer being read by the IDF shader (GP2), which logically follows motion compensation.

Accordingly, various instructions and registers are described for providing synchronization between the various stages comprised of the programmable shaders. In accordance with one embodiment, a local fence/wait synchronization scheme based on sixteen 16-bit counter registers is utilized to provide the level of synchronization required between shader stages and their corresponding tasks. The sixteen 16-bit registers are maintained by the EUP (execution unit pool). Instructions for the shader stages are implemented that work in conjunction with these counter registers. The new instructions added to the shader ISA (instruction set architecture) for performing synchronization are now described.

To facilitate synchronization between the various shader stages (GP0-GP3), the following instructions are added to the shader ISA: STREG for performing register store and CHKCTR for performing counter check. The STREG instruction is generally equivalent to a fence instruction and is used to write to the counter registers. The CHKCTR instruction is generally equivalent to a wait instruction and is used to read the counter registers. In particular, the CHKCTR instruction receives two parameters: a counter (number) and a wait value to be compared with to that particular counter. Thus, the CHKCTR instruction compares the wait value with the current register value. If the value is less than or equal to the current value, shader execution continues, otherwise the thread is put to sleep until the counter reaches the required value. Multiple CHKCTR instructions are generally utilized when multiple counters are to be checked. Table 1 below is just one embodiment for implementing the STREG instruction:

TABLE 1

STREG Instruction

| | | | | | Opcode: | | | | | | | | |
|---|---|---|---|---|---|---|---|---|---|---|---|---|---|
| | 53 | 52 | 51 | 50 | 49 | 38 | 37 | 36 | 35 | 34 | 33 | 32 | 31 |
| STREG | 1 | 0 | 0 | 0 | 0 | 0 | 1 | 0 | 0 | 0 | 1 | 1 | 1 |

Description:
STREG Rd, Rs1

Register store operation.
The IMM field bit 10~13 specifies the destination block that receives the store register/command data.
0: the memory
1: the CSP
2: the EUP
3: the TCC
4~15: reserved
STREG stores 512-bit data. The destination of the store operation may be memory, CSP, EUP or TCC. Note, if STREG is used to pass registers/commands, the 164-bit register/command content is stored from the LSB of the 512-bit data entry.

| The 164-bit register/command content is defined as follows: | | | | | |
|---|---|---|---|---|---|
| sub type | type | 2 | 163 | 162 | 0: REG<br>1: CMD |
| field | <R> | 14 | 161 | 148 | |
| field | vmsk | 4 | 147 | 144 | Valid Mask<br>REG/CMD:<br>[0]: data[31:0]<br>[1]: data[63:32]<br>[2]: data[95:64]<br>[3]: data[127:96] |
| type | REG | | | | |
| field | <R> | 2 | 143 | 142 | |
| field | blk_id | 6 | 141 | 136 | |
| field | reg_addr | 6 | 135 | 130 | |
| field | reg_off | 2 | 129 | 128 | REG address |

TABLE 1-continued

| field | data | 128 | 127 | 0 |
|---|---|---|---|---|
| type | CMD | | | |
| field | <R> | 2 | 143 | 142 |
| field | blk_id | 6 | 141 | 136 |
| field | <R> | 8 | 135 | 128 |
| field | data | 128 | 127 | 0 |

(offset shown above rightmost column)

When the destination specified is memory, the data is sent to the MXU (memory access unit) through the EU Pool memory channel (bypassing the L2 cache); the non-cacheable bit on the X-out bus is set. The memory address is given by register Rd.
When the destination is the CSP (command stream processor), the data is sent to the MXU through the EU Pool memory channel (bypassing the L2 cache); the non-cacheable bit and CSP write bit on the X-out bus is set; the CSP write bit on the EUP to MXU bus is set. This is for passing the AES decryption key to the CSP.
When the destination is the EUP, the data is sent to the EUP through the X-out Vertex Cache channel. This is for passing the TRIGGER command to flush/invalidate the L2 cache and updating the EUP GP shader counters by SetRegister.
When the destination is the TCC, the data is sent to the EUP through the X-out Vertex Cache channel; the data is then forwarded to the TCC. This is for passing the TRIGGER command to flush/invalidate the texture cache.

Table 2 shows an embodiment of the CHKCTR instruction:

TABLE 2

CHKCTR Instruction

Opcode:

| | 5 3 | 5 2 | 5 1 | 5 0 | 4 9 | 3 8 | 3 7 | 3 6 | 3 5 | 3 4 | 3 3 | 3 2 | 3 1 |
|---|---|---|---|---|---|---|---|---|---|---|---|---|---|
| CHKCTR | 1 | 0 | 0 | 0 | 0 | 0 | 1 | 0 | 1 | 1 | 1 | 1 | 1 |

Description:
CHKCTR Rd, Rs1

CHKCTR source 1 (Rs1) specifies a group of 4 registers that hold up to 32 16-bit counter reference values. When a counter is not used for comparison, the corresponding reference value is set to 0 so that the comparison of less or equal to the central counter always passes.
The CRF register at source 1,
Bit 0~15: counter 0 reference value
Bit 16~31: counter 1 reference value
... ...
Bit 112~127: counter 7 reference value
The CRF register at (source 1) + 1,
Bit 0~15: counter 8 reference value
Bit 16~31: counter 9 reference value
... ...
Bit 112~127: counter 15 reference value
The comparison done at the EU:
Ref 0 <= Cntr 0 && Ref 1 <= Cntr 1 && ... Ref 15 <= Cntr 15,
If the comparison result is true, the thread will continue execution; if the comparison result is false, the thread will be suspended until it passes the check, during this time the thread will remain in active.
The EUP will broadcast the counter value to all EUs through dedicate buses once the central counter is updated; only one counter is allowed to be updated in the EUP at one cycle.

By way of illustration, the following is a typical sequence for operating the various shader stages while incorporating the synchronization scheme in conjunction with the STREG and CHKCTR instructions described above. First, the 512-bit input data in CRF (common register file) registers 0 and 1 are parsed and counter values specifying wait times are extracted. One or more CHKCTR instructions are then performed in order to: 1) check whether all input buffers are ready; and 2) to check whether all output buffers are ready. If necessary, input data is read from one or more buffers. Generally, the address of these buffers is passed in the 512-bit input data mentioned above. Various computations are performed, and data is written out. Next, a range in the EU L2 cache range written to is flushed and/or invalidated, if necessary using the STREG instruction. This is performed to maintain memory coherency. Also, if necessary, the texture cache is invalidated using the STREG instruction. The EUP synchronization counters are updated for the other shader stages using the STREG instruction. An external fence is sent to the graphics driver in order to indicate the processing position of the hardware.

A separate fence address is used by each general purpose shader stage since the stages run in different relative orders (except where this is prevented with the sync counters). The counters are incremented, and for each thread, a determination is made on what values of counters to wait on prior to starting execution. This information is provided as input data to each shader stage thread. Furthermore, update values for the counters to be updated are supplied at the end of the thread execution.

While the synchronization scheme described above relates to execution of shader stages for video decoding and video post-processing, AES decryption of protected video content is also supported. The decryption process is performed in the CSP as part of the VPT (Virtual Page Table) block. When video decryption is required, copying/decrypting from a buffer in the PCIE system memory to another buffer in video memory is performed followed by reading of that video frame buffer as input to the VLD shader stage. Both system and video memory are limited, so buffers are normally recycled. To reuse buffers written by the driver, the external fence command is utilized. To recycle buffers in video memory, the EUP counters are used with the EUP fence/wait mechanism (i.e., with the internal wait command in the CSP and STREG instruction from the GP0 VLD shader).

As the video memory buffers are limited, the video memory buffers are recycled where buffers that have already been read are refilled. In order to decouple the driver from the hardware as much as possible (because of the long latency between filling a command DMA buffer and execution of the commands there), the driver places an Internal Wait command in front of the AES copy command in order to wait a period of time until a counter reaches a value such that reading of the destination location is performed and can be overwritten. The copy command may be followed first by an Internal Wait command to ensure the completion of the AES copy and followed by a counter update in order to indicate to the GP0 shader stage that new data is available. The CSP only has read access (in the Internal Wait command) to the first 4 counters (0-3), but the CSP can update any of the sixteen 16-bit counter registers. The counters set by the CSP are read by the GP shaders (typically GP0), and the counters it reads in the Internal Wait command are set by the shaders with the STREG command (typically by GP0).

It should be emphasized that the multi-GP stage architecture described provides a highly flexible programming model whereby video decoding performance can be tuned based on the application. Such performance tuning involves both thread granularity and adjustment of the cache hit rate. For each video decoding thread, the data processing can be a MB (macroblock), a slice (thread for MC/IDF, etc.), or a frame. Further, the parallel running threads can be limited to either one or multiple frames. Different levels of data granularity results in different levels of decoding performance and at the same time, different levels of driver complexity.

For purposes of illustration, an example involving utilization of the multi-GP stage architecture is now described. In this non-limiting example, GP0, GP1, and GP2 are linked in a pipeline configuration. Further, it is assumed that the number of slices in a given frame is known and that an appropriate number of "kickoffs" needed for each of the stages of decoding. A kickoff generally refers to execution of a particular stage. For this example, in a frame with 2 slices, 2 GP0 kickoffs (i.e., one per slice) are initiated followed by 2 GP1 kickoffs (again, one per slice), followed by 1 GP2 kickoff (i.e., one for the whole frame).

As described earlier, GP0 is utilized to perform variable length decoding. The input for this stage comprises slice addresses and parameters relating to the slice. The input further comprises the address(es) of the output buffer. The EUP waits on counter[0] to avoid overwriting the input data of the motion compensation stage (GP1). GP1 updates counter[0]. As described earlier, a local fence/wait synchronization scheme based on sixteen 16-bit counter registers is utilized to provide the level of synchronization required between shader stages and their corresponding tasks. The sixteen 16-bit registers are maintained by the EUP (execution unit pool). The driver generally allocates an array of output buffers, which provide sufficient buffering for the largest slice output. The shader fills in one or more buffers with motion compensation data. The input data packet (e.g., how many buffers were written to) for the succeeding GP1 stage (which performs motion compensation) can be written by the GP0 stage or by the driver or some combination. Upon completion of the current stage, the EUP kicks off the next decoding stage as soon as the counter values gating the kickoff reach the appropriate values.

Upon completion of the GP0 thread, a counter, which gates execution of the AES decoding operations in the CSP is updated. Alternatively, this can be done after the MC thread complete.) The data in the execution unit L2 cache will likely not need to be emptied or invalidated in this case, so the corresponding register control bits for GP0 are set to 0. Furthermore, the texture cache likely does not need to be invalidated, and the corresponding control bit is thus also set to 0. The fence data is written to the fence address. As soon as one GP0 thread is launched, another GP0 thread can be kicked off right away. However, the total number of GP0 threads should not exceed 2.

GP1 is used to perform transform, motion compensation, and in some cases, de-blocking. Generally, one thread processes one entire slice. The input data packet comprises the total number and address(es) of the motion comp buffer(s) (with MBC, MV, and residual data), the output buffer address (address of the decoded frame), the texture mapping table, in addition to other data. The EUP waits on counter[1] and counter[2]. Counter[1] indicates that all the reference frames are decoded, and counter[2] indicates whether the output buffer is available to be written to. The shader reads the motion compensation buffer and generates the decoded frame. When GP1 completes execution, counter[0] is updated. This gates AES decoding into the VLD input buffer.

During execution of the GP1 stage, the following takes place. The external fence data is written to the fence address. The EUP L2 cache is typically emptied so that the decoded frame can be read through the texture cache when reading it as a reference for future frame decoding. The texture cache is also typically invalidated. Upon completion of the GP0 thread(s), a GP1 thread is kicked off.

The GP2 stage performs in-loop deblocking filtering (IDF) on one frame or field and other functions, such as deinterlacing. Generally, one slice processes one frame. For the GP2 stage, the input data comprises, the address of the decoded frame, the output buffer address and other driver-defined data. The EUP waits on a counter to ensure that the output buffer can be written to without overwriting data to be read. Upon completion of the GP2 shader, the appropriate counter is updated, the external fence is written out, and the EUP L2 cache may have to be emptied, depending on how the next stage reads in the output from the GP2 stage. For example, if the next stage performs additional post-processing where data is written with texture operations, the EUP L2 is flushed at this point. As another example, if the next stage reads the data as texture for display (by the display interface unit, or DIU), the cache must also be flushed in this case. If the output buffer overlays data previously read in through the texture cache, the texture cache should be invalidated to avoid stale data from being read. As discussed earlier, GP3 is used to perform general post-processing. This may comprise such functions as de-interlacing, scaling, color space conversion, etc.

Figure 6:
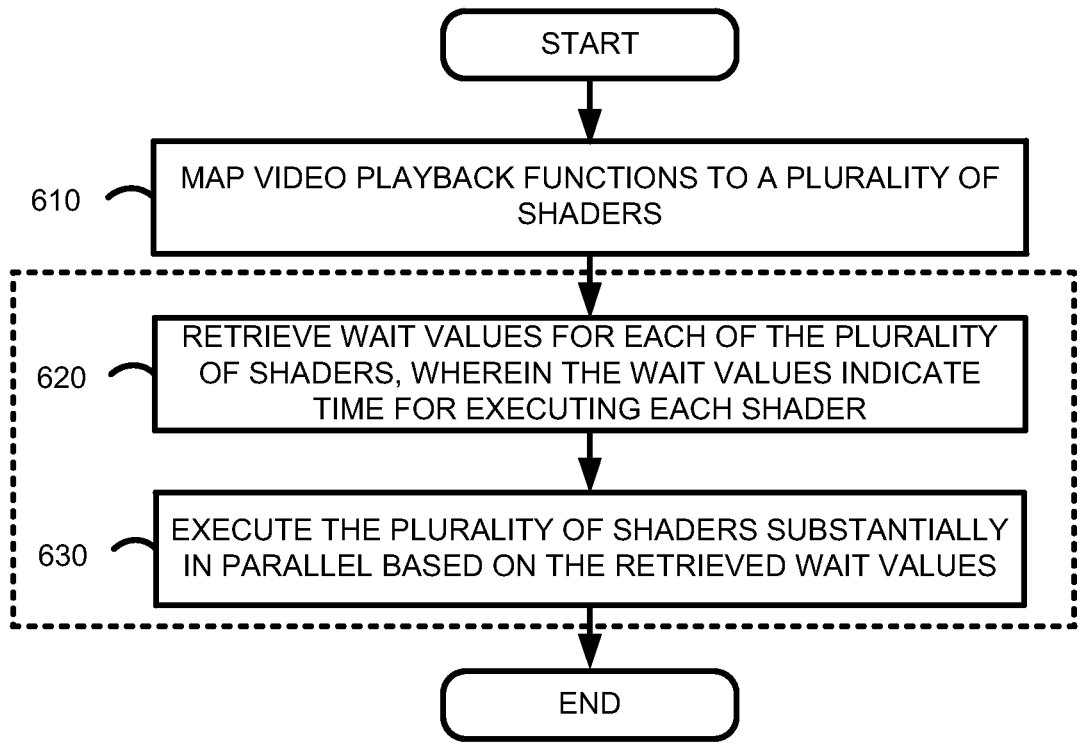
FIG. 6 is a flowchart of an embodiment for performing video playback with a multi-shader configuration.

FIG. 6 is a flowchart for an embodiment of performing video processing using a multi-shader scheme within a CSP. Block 610 begins by mapping the various functions required for video playback to a plurality of shaders. For some embodiments, this may be performed in accordance with the mapping scheme illustrated in FIG. 3. In block 620, the wait values for each of the plurality of shaders are retrieved. These wait values are associated with the execution time of each of the shaders. In block 630, each of shaders are then executed substantially in parallel based on these retrieved wait values. Generally, blocks 620 and 630 are directed to the synchronization scheme described earlier. Also, as described in detail earlier, the synchronization scheme utilizes the counter registers 528 in FIG. 5.

Figure 7:
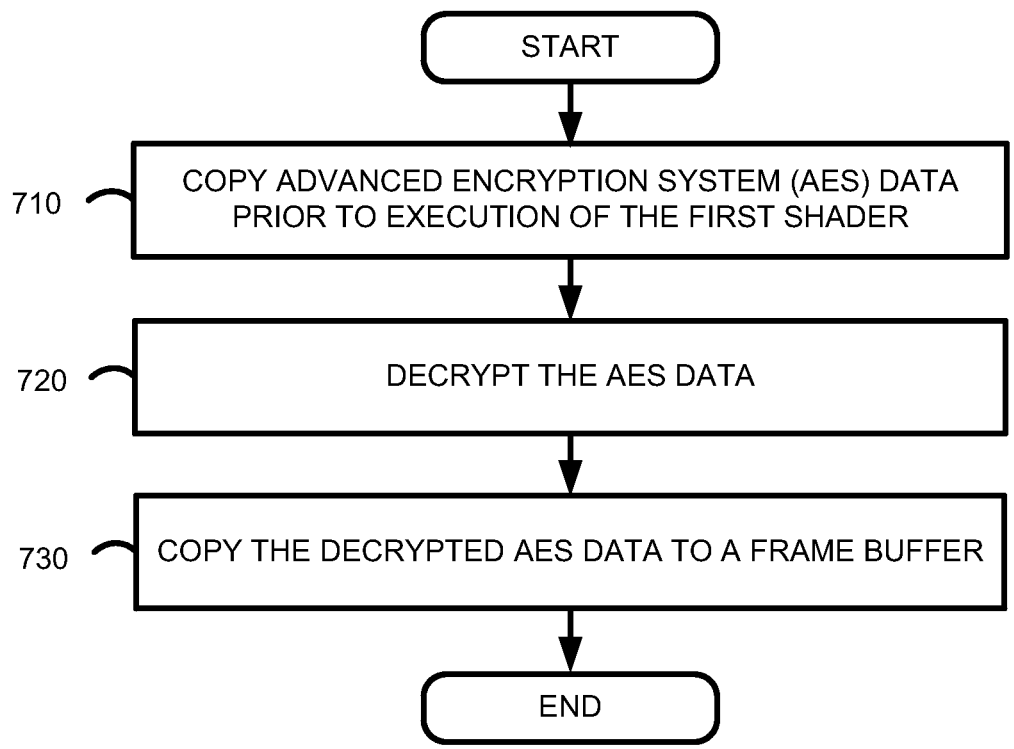
FIG. 7 is a flowchart of an embodiment for copying of Advanced Encryption System (AES) information.

FIG. 7 is a flowchart of an embodiment for copying of Advanced Encryption System (AES) information. Block 710 begins by copying AES information in the CSP prior to execution of the first shader (i.e., GP0). In particular, this step involves copying the encrypted bit stream data from PCIE (peripheral component interconnect express) memory into the frame buffer. In block 720, the bit stream is decrypted during the copying process. The decrypted bit stream is then copied to a frame buffer. The process described is utilized for playback of protected content. As described earlier, the AES key used for decrypting the bit stream is generated before any of the four shader stage tasks, as the decryption key is used for VLD streams.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A multi-shader system in a programmable graphics processing unit (GPU) for processing video data, comprising:
   a first shader stage executed by the GPU, configured to receive slice data from a frame buffer and perform variable length decoding (VLD), wherein the first shader stage outputs data to a first buffer within the frame buffer;
   a second shader stage executed by the GPU, configured to receive the output data from the first shader stage and perform transformation and motion compensation on the slice data, wherein the second shader stage outputs decoded slice data to a second buffer within the frame buffer;
   a third shader stage executed by the GPU, configured to receive the decoded slice data and perform in-loop deblocking filtering (IDF) on the frame buffer;
   a fourth shader stage executed by the GPU, configured to perform post-processing on the frame buffer; and
   a scheduler executed by the GPU, configured to schedule execution of the shader stages, the scheduler comprising a plurality of counter registers;
   wherein execution of the shader stages is synchronized utilizing the counter registers, wherein the second shader stage outputs unfiltered YUV-based color space video data, wherein the third shader stage performs IDF on an entire frame of unfiltered YUV-based color space video data to generate the final YUV-based color space video data, and wherein the final YUV-based color space video data is cycled back to the second shader stage to undergo motion compensation.

2. The system of claim 1, further comprising an Advanced Encryption System (AES) module for copying encrypted data from memory to the frame buffer, wherein the AES module is further configured to decrypt the data while copying the data, wherein the AES module is further configured to decrypt the data in a command stream processor (CSP).

3. The system of claim 1, further comprising a command queue comprising entries corresponding to threads within the shader stages.

4. The system of claim 1, wherein the counter registers each contain wait values associated with a corresponding shader stage, wherein the counter registers are updated upon execution of each shader stage.

5. The system of claim 4, wherein the wait values indicate time for executing each shader.

6. The system of claim 1, wherein the shader stages are configured in a pipeline configuration such that the shader stages are executed substantially in parallel.

7. The system of claim 1, wherein the output data from the first shader stage comprises resulting motion vectors, residual data, and macroblock control structures.

8. The system of claim 1, wherein the post-processing performed by the fourth shader stage comprises Film Grain Technology (FGT) and de-interlacing, and wherein the fourth shader stage is further configured to post-process one of: an entire frame and an entire thread.

9. The system of claim 1, wherein the shader stages are further reconfigured as a vertex shader, geometry shader, and pixel shader in 3D pipeline upon completion of the video data.

10. The system of claim 1, wherein the video data comprises one of:
    H.264 data;
    VC-1 data;
    Windows Media Video 9 (WMV9) data; and
    MPEG-2 data.

11. A method for processing video data utilizing a multi-shader configuration, comprising:
    mapping, by a programmable graphics processing unit (GPU), video playback functions to a plurality of shaders;
    retrieving, by a programmable graphics processing unit (GPU), wait values for each of the plurality of shaders, wherein the wait values indicate time for executing each shader;
    executing substantially in parallel in a command stream processor (CSP) of the GPU:
       a first shader for variable length decoding (VLD);
       a second shader for transformation and motion compensation; and
       a third shader for in-loop deblocking filtering (IDF), wherein the second shader stage outputs unfiltered YUV-based color space video data, wherein the third shader stage performs IDF on an entire frame of unfiltered YUV-based color space video data to generate the final YUV-based color space video data, and wherein the final YUV-based color space video data is cycled back to the second shader stage to undergo motion compensation.

12. The method of claim 11, further comprising executing a fourth shader for post-processing, wherein post-processing comprises at least one of:
   Film Grain Technology (FGT);
   de-interlacing;
   scaling; and
   color space conversion.

13. The method of claim 11, further comprising updating associated counter registers upon completion of each shader.

14. The method of claim 11, wherein executing a first shader for variable length decoding (VLD) comprises reading slice data from a frame buffer and outputting resulting motion vector, residual data, and macroblock control structures to a first buffer within the frame buffer;
   wherein executing the second shader comprises retrieving data from the first buffer and performing transformation and motion compensation on a single slice and outputting a decoded slice in a second buffer within the frame buffer; and
   wherein executing the third shader comprises retrieving data from the second buffer and performing IDF on one of a frame and a field.

15. The method of claim 11, further comprising scheduling execution of the shaders based on the wait values for each of the plurality of shaders.

16. A graphics processing system for processing video data, comprising:
   a plurality of shaders executed by a command stream processor (CSP), the plurality of shaders comprising:
      a first shader configured to perform variable length decoding (VLD), wherein the first shader stage outputs data to a first buffer within the frame buffer;
      a second shader configured to received the output from the first shader stage and perform transformation and motion compensation on the slice data, wherein the second shader stage outputs decoded slice data to a second buffer within the frame buffer;
      a third shader configured to receive the decoded slice data and perform in-loop deblocking filtering (IDF) on the frame buffer; and
      a fourth shader configured to perform post-processing on the frame buffer, wherein the second shader stage outputs unfiltered YUV-based color space video data, wherein the third shader stage performs IDF on an entire frame of unfiltered YUV-based color space video data to generate the final YUV-based color space video data, and wherein the final YUV-based color space video data is cycled back to the second shader stage to undergo motion compensation;
   a plurality of counter registers storing wait values associated with each of the plurality of shaders; and
   a scheduler for timing execution of the plurality of shaders based on the wait values.

17. The system of claim 16, wherein the plurality of shaders are further configured to check wait values associated with other shaders prior to execution.

* * * * *